US009520153B2

(12) United States Patent
Olivero et al.

(10) Patent No.: US 9,520,153 B2
(45) Date of Patent: Dec. 13, 2016

(54) APPARATUS WITH DISC SEPARATOR PLATES

(71) Applicant: Seagate Technology LLC, Cupertino, CA (US)

(72) Inventors: David A. Olivero, Broomfield, CO (US); Stephen Robert Martin, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/678,551

(22) Filed: Apr. 3, 2015

(65) Prior Publication Data
US 2016/0293202 A1 Oct. 6, 2016

(51) Int. Cl.
G11B 33/14 (2006.01)
G11B 17/02 (2006.01)

(52) U.S. Cl.
CPC ............ G11B 17/021 (2013.01); G11B 33/14 (2013.01)

(58) Field of Classification Search
CPC ................................ G11B 33/14; G11B 5/012
USPC ................................ 360/97.02, 97.01, 97.03
See application file for complete search history.

(56) References Cited

U.S. PATENT DOCUMENTS

| 5,801,899 | A * | 9/1998 | Genheimer | G11B 21/12 360/97.2 |
| 6,226,144 | B1 * | 5/2001 | Nagl | G11B 33/08 360/97.2 |
| 6,271,987 | B1 * | 8/2001 | Allsup | G11B 33/08 360/97.2 |
| 6,301,073 | B1 * | 10/2001 | Gillis | G11B 5/4886 360/254.8 |
| 6,417,986 | B1 * | 7/2002 | Tran | G11B 25/043 360/99.16 |
| 6,542,328 | B2 | 4/2003 | Harrison et al. | |
| 6,888,697 | B1 | 5/2005 | Oveyssi | |
| 7,119,986 | B2 | 10/2006 | Alt et al. | |
| 7,310,199 | B2 * | 12/2007 | Pottebaum | G11B 33/142 360/97.14 |
| 7,733,602 | B2 | 6/2010 | Gross et al. | |
| 8,199,426 | B2 | 6/2012 | Hendriks | |
| 8,619,386 | B2 | 12/2013 | Chan | |
| 2002/0181148 | A1 * | 12/2002 | Dahlenburg | G11B 5/6005 360/97.13 |
| 2003/0002206 | A1 * | 1/2003 | Long | G11B 33/08 360/97.15 |
| 2006/0146443 | A1 * | 7/2006 | Chang | G11B 5/6005 360/97.2 |
| 2010/0091408 | A1 * | 4/2010 | Albrecht | G11B 17/26 360/244 |

(Continued)

Primary Examiner — Allen T Cao
(74) Attorney, Agent, or Firm — Crawford Maunu PLLC

(57) ABSTRACT

Certain exemplary aspects of the present disclosure are directed towards an apparatus including a base deck, a plurality of storage mediums (e.g., discs) and a plurality of disc separator plates. The base deck includes a sidewall forming a cavity to house the storage medium, with slots in the sidewall in which each disc separator plate extends. The disc separator plates extend into spaces between peripheral ends of adjacent ones of the storage medium. This arrangement can be used to provide rigid coupling of the separator plates, which can mitigate issues relating to vibration or shock. Further, air flow can be mitigated in this regard, such as to reduce effects upon a magnetoresistive transducer that reads data from the storage mediums.

20 Claims, 3 Drawing Sheets

(56) References Cited

U.S. PATENT DOCUMENTS

2014/0335371 A1    11/2014    How et al.

* cited by examiner

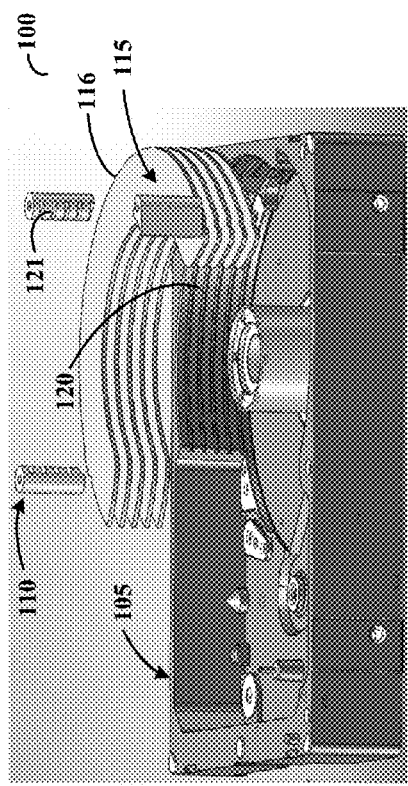
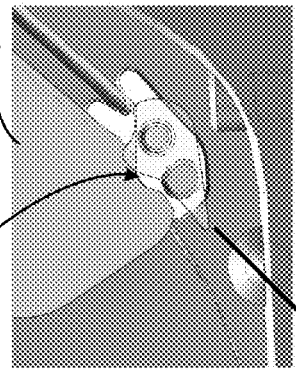
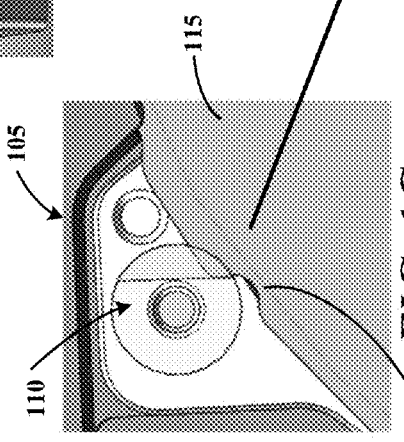
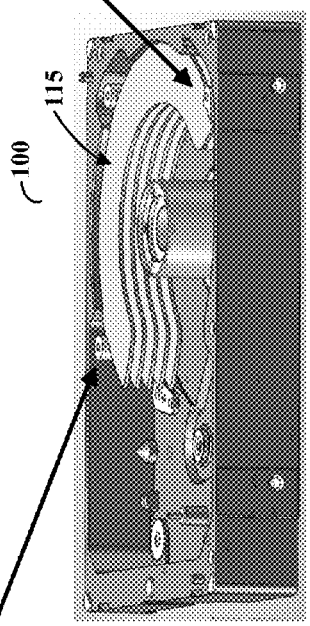
FIG. 1A
FIG. 1B
FIG. 1C
FIG. 1D

APPARATUS WITH DISC SEPARATOR PLATES

SUMMARY

Various example embodiments are directed to apparatuses and/or methods that facilitate the coupling of disc separator plates to a base deck. The coupling can be carried out in a manner that mitigates displacement of the disc separator plates and other components of a disc drive under various operating conditions, including those involving vibration and shock events that may otherwise cause contact between the disc separator plate and a storage medium ("disc"). Certain embodiments couple most or all of an outer diameter periphery of each disc separator plate to a slot in a sidewall of the base deck. In some implementations, such approaches are achieved while also limiting tolerance stack-up associated with coupling a number of disc separator plates (and other components) to one another. One or more embodiments may be particularly applicable, for example, to disc drives in which disc separator plates and spacers are alternately stacked to mitigate or prevent the effect of turbulent atmospheric flow around a magnetoresistive head within the disc drive and mitigate disk mode displacements resulting from turbulent air flow excitation. These approaches may be carried out while also reducing assembly, part costs, stacking tolerances and the potential for data loss during a shock/vibration event.

In an exemplary embodiment, an apparatus is disclosed including a plurality of storage mediums, a base deck, and a plurality of disc separator plates. The plurality of storage mediums are spaced apart from one another in a stacked arrangement. The base deck includes a sidewall that forms a cavity and houses the plurality of storage mediums. The base deck further includes a plurality of slots in the sidewall, the slots being aligned with spaces between peripheral ends of adjacent ones of the storage mediums. The plurality of disc separator plates are fixed within and held by one of the slots, and each separator plate extends into one of the spaces between peripheral ends of adjacent ones of the storage mediums. As each of the disc separator plates is supported along its outer diameter by one of the slots, the apparatus displays reduced disc separator plate deflection during vibration and shock events. This reduced deflection reduces the likelihood that the disc separator plate may contact one of the storage mediums causing data loss and possibly disc drive failure.

In more specific embodiments of the present disclosure, the plurality of storage mediums have planar surfaces separated by a thickness, and exhibit a periphery having a circular shape. The sidewall has an inner surface that is concentric with, and extends at least partially along, the periphery of the storage mediums. Accordingly, the slots extend into the inner surface of the sidewall continuously and laterally along the periphery of the storage mediums. The separator plates (in conjunction with the base deck and slots) mitigate gas flow forces upon one or more magnetoresistive transducers that read data from the storage mediums, by mitigating the generation of gas flow (e.g., turbulence) due to rotation of the storage mediums.

In some embodiments of the present disclosure, an apparatus is disclosed including a plurality of storage mediums, a base deck, a plurality of disc separator plates, and a plurality of stacking rings. The plurality of storage mediums are spaced apart from one another in a stacked arrangement, each storage medium having a planar surface separated by a thickness and exhibiting a periphery having a circular shape. Data locations on the planar surface of the plurality of storage mediums are accessed by at least one magnetoresistive transducer as the plurality of storage mediums are rotated at high velocity. The base deck includes a sidewall that forms a cavity within the base deck. The cavity of the base deck houses the plurality of storage mediums and the at least one magnetoresistive transducer. A plurality of stacking rings and disc separator plates are also housed in the cavity of the base deck. The plurality of stacking rings have surfaces that are concentric with the periphery of the plurality of storage mediums and the base deck sidewall. The stacking rings extend contiguously and laterally along the periphery of the storage mediums. The plurality of disc separator plates are coupled to the base deck by at least one of the stacking rings. Each separator plate extends into one of the spaces between peripheral ends of adjacent ones of the storage mediums.

In more detailed embodiments of the present disclosure, the apparatus further includes a fastener coupled to a proximal surface of the base deck. The fastener exerts a downward force upon the plurality of disc separator plates and stacking rings. In such an embodiment, the plurality of disc separator plates include a plurality of extrusions spaced along a peripheral end of the disc separator plates. Each extrusion interacts with the stacking rings to deform under compression exerted by the fastener via the downward force, and to maintain an upper surface of the stacked disc separator plates and stacking rings that is about level with the proximal (e.g., upper) surface of the base deck. In conjunction with such embodiments, it has been discovered that the compression forces exerted on the extrusions of each disc separator plate evenly deform the extrusions of each disc separator plate. This deformation of the extrusions mitigates tolerance stack-up caused by the use of high-tolerance parts (e.g., disc separator plates and/or stacking rings). Such tolerance stack-up often causing disk separator plate tilt relative to the storage medium. Accordingly, the present embodiment allows for the use of low-cost, high-tolerance parts, while preventing tolerance stack-up that could result in unwanted contact between the storage medium and disc separator plates causing damage to the disc and data loss during vibration/shock events. The present embodiments also enable a top-down assembly of the disc drive.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 1A is an exploded view of a disc drive assembly including a base deck, disc separator plates, and posts, consistent with various aspects of the present disclosure;

FIG. 1B is a perspective view of the disc drive assembly including base deck, disc separator plates, and posts, consistent with various aspects of the present disclosure;

FIG. 1C is a top view of a post mounted to the base deck and interacting with a plurality of disc separator plates, consistent with various aspects of the present disclosure;

FIG. 1D is a top view of a post mounted to the base deck and interacting with a plurality of disc separator plates, consistent with various aspects of the present disclosure;

Figure 2A:
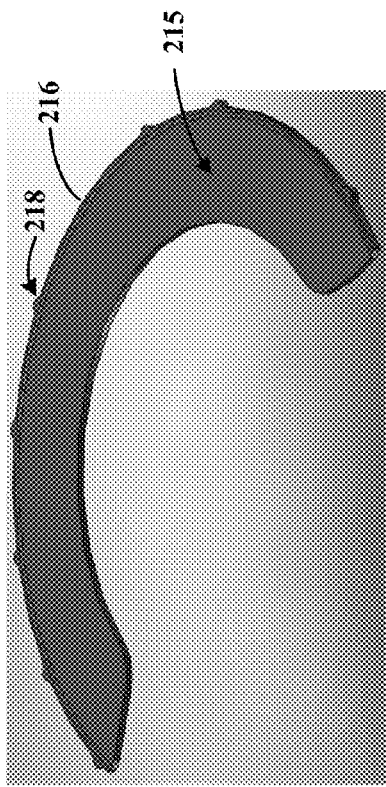
FIG. 2A is a perspective view of a base deck, consistent with various aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of methods, devices, systems and arrangements involving disc separator plates and a corresponding base deck mounting configuration, as may be implemented for disc drives. Specific embodiments are believed to be particularly beneficial to disc drive apparatuses in applications prone to vibration/shock events, such as disc drives used in mobile devices, and to disc drive apparatuses prone to issues relating to airflow caused by rotation of storage discs. For instance, various aspects of the disclosure are directed to approaches to coupling and supporting disc separator plates that enhance resistance to movement due to vibration or shocks, which can permit the arrangement of discs and disc separator plates in closer proximity. This can also facilitate a reduction in air flow. While the present invention is not necessarily so limited, various aspects of the invention may be appreciated through a discussion of examples using these contexts.

Various example embodiments are directed to apparatuses and/or methods that facilitate the coupling of disc separator plates to a base deck in a manner that minimizes displacement of the disc separator plates. Such embodiments are useful under conditions including vibration and shock events that may otherwise cause contact between the disc separator plate and a disc. Certain embodiments achieve such low displacement of the disc separator plate by coupling all of, or nearly all of, an outer diameter periphery of each disc separator plate to a slot in a sidewall of the base deck. In some implementations, such approaches are achieved while also limiting tolerance stack-up associated with coupling a number of disc separator plates (and other components) to one another. One or more of these embodiments may be particularly applicable, for example, to disc drives in which disc separator plates and spacers are alternately stacked to mitigate or prevent the effect of turbulent atmospheric flow around a magnetoresistive head within the disc drive, while also reducing assembly, part costs, and the potential for data loss during a shock/vibration event. In conjunction with one or more such embodiments, it has been discovered that an approach to coupling a disc separator plate to a base deck involving such coupling of the outer diameter of the disc separator plate to the base deck can stiffen the disc separator plate by as much as 50%, thereby reducing the displacement of the disc separator plate during vibration/shock events and mitigating data loss and disc drive failure. This approach also facilitates the use of designs with closer spacing between separator plates and discs while ensuring that the components do not touch.

Various example embodiments are directed to methods and/or apparatuses that involve reducing atmospheric velocity along discs that negatively impacts seek and read/write performance of magnetoresistive heads in a disc drive. In one such embodiment, an apparatus is disclosed including a plurality of storage mediums, a base deck, and a plurality of disc separator plates. The plurality of storage mediums are spaced apart from one another in a stacked arrangement and the data stored thereon is accessed, for example, by one or more magnetoresistive transducers. The base deck includes a sidewall that forms a cavity and houses the plurality of storage mediums. The base deck further includes a plurality of slots in the sidewall, the slots being aligned with spaces between peripheral ends of adjacent ones of the storage mediums. The plurality of disc separator plates are fixed within and held by one of the slots, and each separator plate extends into one of the spaces between peripheral ends of adjacent ones of the storage mediums. In more specific embodiments, each slot compresses one of the disc separator plates within opposing sidewalls of the slot, therein securing the separator plate within the slot and fixing the separator plate in the space between the adjacent ones of the storage mediums. As each of the disc separator plates is essentially supported along its entire outer diameter by one of the slots, the apparatus displays reduced disc separator plate deflection during vibration and shock events. This reduced deflection decreases the likelihood that the disc separator plate may contact the storage media causing data loss and possibly disc drive failure, and can further mitigate air flow about the discs.

In more specific embodiments of the present disclosure, the storage mediums have planar surfaces separated by a thickness, and exhibit a periphery having a circular shape. The sidewall has an inner surface that is concentric with, and extends at least partially along, the periphery of the storage mediums. Accordingly, the slots extend into the inner surface of the sidewall continuously and laterally along the periphery of the storage mediums. The separator plates (in conjunction with the base deck and slots) mitigate gas flow forces upon the magnetoresistive transducer(s), by mitigating the generation of gas flow due to rotation of the storage mediums.

In some embodiments, the base deck further includes a plurality of vertical grooves in the sidewall, extending from a top surface of the base deck and through the plurality of slots in the sidewall. These vertical grooves interact with extrusions along a peripheral end of each of the disc separator plates. During assembly, the disc separator plates may be lowered vertically down into a cavity of the base deck, interacting with the base deck's vertical grooves to properly align the disc separator plates to the base deck. Upon reaching an appropriate slot for the disc separator plate, the disc separator plate is rotated and the extrusions interlock with one of the slots of the base deck. In other embodiments, the apparatus further includes at least one post that is fastened to the base deck and that secures the plurality of disc separator plates to the base deck by applying a directed force that retains each of the plurality of disc separator plates within a corresponding slot.

Embodiments of the present disclosure teach positioning the disc separator plates, sidewall, and slots circumferentially at the outer circumference of the storage mediums to direct airflow generated by rotation of the storage mediums away from the magnetoresistive transducer. In various embodiments, the disc separator plates also mitigate air flow between the storage mediums along a surface of the sidewall in which the slots are formed. Airflow generated by the storage medium may otherwise cause turbulent forces to be exerted upon the magnetoresistive transducer which can affect performance of the disc drive including seek times, and cause off-track events which may result in the unintentional permanent over-write of data. In specific exemplary embodiments, it has been discovered that disc separator plates, in conjunction with their corresponding slot, mitigate air flow-induced turbulence on the plurality of discs and stabilize a layer of air flow at a junction between the peripheral ends of the plurality of storage mediums and the sidewall. Furthermore, the disc separator plates also minimize axial disk mode displacement, mitigating magnetoresistive head off-track events at specific vibration/shock frequencies associated with the axial disk mode.

Consistent with further embodiments, other aspects are directed toward an apparatus that includes a base deck and disc separator plate that are coupled together to form a base deck with integrated disc separator plates, which reduces turbulence-related read/write performance effects. In some embodiments, the disc separator plate and base deck form an interior joint which is fully welded, spot welded or partially-welded to stiffen the disc separator plate that may otherwise vibrate during operation of the disc drive. In certain embodiments where a full inside weld is not used or possible, a mechanical labyrinth is formed in the joint between the base deck and disc separator plate, and can be filled with a polymer-type material such as epoxy. This epoxy, once cured, further couples the disc separator plate to the base deck and further enforces the disc separator plate against vibration/shock events during operation of the disc drive. In some embodiments, the mechanical labyrinth reduces air flow between the discs and traps particles.

Consistent with various other embodiments and aspects of the present disclosure, an apparatus is disclosed including storage mediums, at least one magnetoresistive transducer, a base deck, disc separator plates, and stacking rings. The storage mediums are spaced apart from one another in a stacked arrangement, with each storage medium having a planar surface separated by a thickness and exhibiting a periphery having a circular shape. Data locations on the planar surface of the storage mediums are accessed by at least one magnetoresistive transducer as the storage mediums are rotated at high velocity. The base deck includes a sidewall that forms a cavity within the base deck. The cavity houses the storage mediums and the magnetoresistive transducer(s), as well as the stacking rings and disc separator plates. The stacking rings have surfaces that are concentric with the periphery of the plurality of storage mediums and the base deck sidewall, and extend contiguously and laterally along the periphery of the storage mediums. The disc separator plates are coupled to the base deck by one or more of the stacking rings, with each separator plate extending into one of the spaces between peripheral ends of adjacent ones of the storage mediums.

Consistent with the above embodiments, each of the disc separator plates includes extrusions that are spaced along a peripheral end of the separator plate and interlock with one of the stacking rings. In some embodiments, the extrusions interact with the stacking rings by deforming under compression, for instance as a downward force is applied to a disc drive assembly as discussed herein. For example, in more detailed embodiments, a fastener is coupled to a proximal surface of a base deck, and exerts a downward force upon the disc separator plates and stacking rings. In such an embodiment, the disc separator plates include extrusions spaced along its peripheral end. Each extrusion interacts with the stacking rings and deforms under the downward force (compression) exerted by the fastener. This coupling may further maintain an upper surface of the stacked plurality of disc separator plates and stacking rings about level with the proximal surface of the base deck. In conjunction with such embodiments, it has been discovered that the compression forces exerted on the extrusions of each disc separator plate, by screws, evenly deform the extrusions of each disc separator plate. This deformation of the extrusions mitigates tolerance stack-up caused by the use of high-tolerance parts (e.g., disc separator plates and/or stacking rings). Accordingly, low-cost, high-tolerance parts can be used while preventing tolerance stack-up that could result in unwanted contact between the storage medium and disc separator plates causing damage to the disc and data loss during vibration/shock events.

Another embodiment is directed to an apparatus having storage mediums spaced apart from one another in a stacked arrangement, one or more magnetoresistive transducers that access data storage locations on the storage medium(s), and a base deck having a sidewall forming a cavity that houses the storage mediums and magnetoresistive transducer(s). Each storage medium has a planar surface separated by a thickness and exhibits a periphery having a circular shape. The sidewall includes slots aligned with spaces between peripheral ends of adjacent ones of the storage mediums, and a disc separator plate extends into each slot such that the slot couples the separator plates to the base deck. Each separator plate further extends into space between peripheral ends of adjacent ones of the storage mediums. In such embodiments, the slot height tolerances (relative to the disk datum) are the same, mitigating stack-up tolerances that may increase the likelihood of contact between one of the storage medium and one of the disk separator plates during a vibration/shock event.

In particular embodiments, the apparatus also includes stacking rings having surfaces that are concentric with the periphery of the plurality of storage mediums and the base deck sidewall, and that extend contiguously and laterally along the periphery of the storage mediums. In such embodiments, the slots have sidewalls defined by the stacking rings, and the disc separator plates are coupled to the base deck by at least one of the stacking rings.

In many applications, a disc separator plate as discussed herein is implemented to maintain disc separator plate to storage media separation, even during vibration and shock events. The disc separator plates substantially eliminate turbulent air flow (caused by the rotation of the discs) between disc surfaces, and also reduce air flow speed along the disc surface due to the friction inducing effect of the disc separator plates. This reduced turbulence ultimately improves the disc drives read/write performance. As a few specific examples, such reduced turbulence may minimize off-track read/write errors and other magnetoresistive head flight characteristics that can cause disc-head contact (damaging the head and/or causing data loss), or cause the head to "over-fly" preventing the magnetoresistive head from being in close enough proximity to read the data from the disc.

In some embodiments of the present disclosure, welding may be used to couple the disc separator plate to the base deck. Welding as used herein may, for example, involve aspects of coupling materials involving soldering, brazing and/or welding in which an additional material is presented and used to generate a melt pool between two materials.

Turning now to the figures, various embodiments of the present disclosure are presented by way of the illustrations. FIG. 1A is an exploded view of a partial disc drive assembly 100 including a base deck 105, posts 110, and disc separator plates 115. In various example embodiments, the posts 110 are mounted to the base deck 105, using a coupling method such as may employ fasteners (e.g., screws), epoxy, or welds. Each disc separator plate's outer diameter 116 is then mated with the corresponding slot 120 in the base deck 105 and the posts' respective slot 121. As the disc separator plate 115 is supported along a majority of its entire outer diameter, the disc drive assembly 100 displays reduced disc separator plate deflection during vibration and shock events. This reduced deflection reduces the likelihood that the disc separator plate 115 may contact the disc (not shown) causing data loss and possibly disc drive failure.

FIG. 1B shows a perspective view of the assembled partial disc drive assembly 100 of FIG. 1A. For clarity, FIG. 1B does not show the discs or the head-stack assembly of the disc drive assembly 100. However, it is understood that discs would be located between each set of disc separator plates 115. The disc separator plates 115 substantially reduce or eliminate turbulent air flow (caused by the rotation of the discs) between disc surfaces, and also reduce air flow speed along surfaces of the discs using a friction inducing effect of the disc separator plates. This reduced turbulence ultimately improves the disc drive's read/write performance. As a few specific examples, such reduced turbulence minimizes off-track read/write errors and other magnetoresistive head flight characteristics that can cause disc-head contact (damaging the head and/or causing data loss), or cause the head to "over-fly" preventing the magnetoresistive head from being in close enough proximity to read the data from the disc.

In some specific embodiments of the present disclosure, the increased vibration/shock resistance of the disc separator plates, due at least in part to each disc separator plate 115 being supported along a majority of its entire outer diameter 116 by its corresponding base deck slot 120, allows for the use of more cost effective materials for the disc separator plate 115 (e.g., plastics, aluminum, etc.). In the alternative (or in combination therewith), thinner disc separator plates 115 and/or smaller gap regions between each disc separator plate 115 and its paired disc(s) may be realized, due to the reduced risk of damage to the discs by the disc separator plates during operational vibration/shock events as facilitated by the coupling as characterized herein. As a result, in some embodiments of the present disclosure, the z-height stack-up of the alternating discs and disc separator plates 115 is reduced or minimized, allowing for smaller disc drive form factors and/or increased discs (and corresponding data capacity increases) in a given disc drive form factor.

FIG. 1C shows a close-up of one exemplary embodiment of mechanical interaction between a post 110 and a disc separator plate 115, shown in FIG. 1B. After the disc separator plate 115 is mated to its respective slot in the base deck 105, the post 110 is rotated to rotationally align the plurality of disc separator plates 115 relative to one another, and to further secure the coupling between each disc separator plate and its respective slot. In some embodiments, the disc separator plates include indents 117 which further accommodate the alignment and securing functionality of the posts 110 and 111. Similarly, in FIG. 1D, an opposing post 111 on the opposite side of the disc separator plate 115 is rotated. In various embodiments, one or more aspects of FIGS. 1A-1C are implemented in connection with one or more other embodiments as discussed herein.

In various embodiments of the present disclosure, a plurality of slots 121 in posts 110 and corresponding slots 120 in the base deck 105 allow for the disc separator plates 115 to be positioned in the disc drive assembly 100 relative to the discs. The use of the slotted base deck 105 and disc separator plates 115 can reduce or minimize tolerance stack-up and costs associated with additional parts and added assembly complexity (e.g., relative to using individual spacers between each disc separator plate). This approach can address issues as noted above, such as where each part's height and flatness imperfections (that vary from design dimensions) may otherwise accumulate as the parts are stacked upon one another. This approach also facilitates the use of relatively lower tolerances in parts. Various embodiments teach nearly eliminating tolerance stack-up associated with the stack of disc separator plates 115, while mitigating component costs. In one specific embodiment, as shown in FIG. 1A, the base deck 105 is manufactured with slots 120 circumferential to the base deck cavity. These slots 120 may be machined into the base deck 105 casting as a secondary operation, or in some embodiments, cast into the base deck 105. As the slots 120 (which set the vertical height of each disc separator plate 115 within the disc drive assembly 100) are all features of the base deck 105, the vertical tolerance of each slot 120 relative to the other slots 120 are not cumulative and maintain safe distances between each disc separator plate 115 and disc. This can reduce cost and assembly complexity.

In some embodiments of the present disclosure, the disc separator plates 115 are assembled into the disc drive assembly 100 by lowering each disc separator plate 115 into the base deck cavity and rotating the disc separator plate 115 into circumferential contact with the corresponding slot 120 in the base deck. In yet other embodiments, the disc separator plate 115 includes a compliant material (or composition of materials that include compliant characteristics). Accordingly, during assembly the disc separator plate 115 can be lowered into the cavity of the base deck 105 while being held in compression that deforms the disc separator plate, and upon proper positioning with its respective slot 120, the disc separator plate 115 is taken out of a compressed state and, as it returns back to its natural state, couples with the respective slot 120 via expansion.

FIG. 2A shows a perspective view of a base deck 105 (205). In this embodiment, the base deck cavity includes horizontal slots 220 and vertical slots 221. These slots may be machined into the base deck casting as a secondary operation, or in some embodiments, cast into the base deck 205 (e.g., vertical slots 221). The vertical slots 221 allow for disc separator plates (not shown) to be vertically installed into the base deck cavity. The horizontal slots 220 are utilized once the disc separator plate arrives at the appropriate height to couple each disc separator plate to the base deck 205.

Figure 2B:
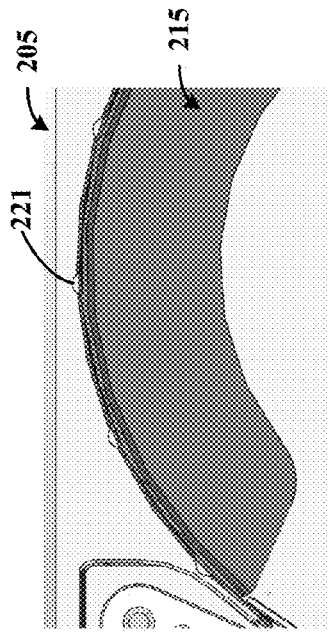
FIG. 2B is a perspective view of a disc separator plate as may be implemented with FIG. 2A, consistent with various aspects of the present disclosure.

FIG. 2B shows a perspective view of a disc separator plate 115 (215) according to an embodiment of the present disclosure. Extrusions 218 are spaced along an outer diameter 216 of the disc separator plate 210. It is to be understood that the extrusions 218 could take a number of shapes and forms, as may a corresponding slot in the base deck, such that the extrusions 218 are designed to couple to such a slot or slots.

Figure 2C:
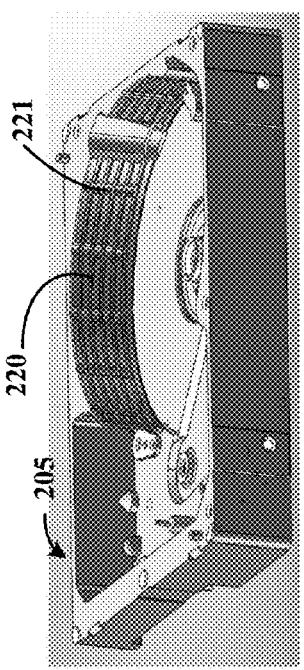
FIG. 2C is a top view of the base deck of FIG. 2A with a disc separator plate coupled thereto, consistent with various aspects of the present disclosure.

In FIG. 2C, a top view of a disc drive assembly 200 is shown. In this top view, a disc separator plate 215 is vertically lowered into a base deck 205 cavity utilizing vertical slots 221 that interact with extrusions 218 extending out of the outer diameter 216 of the disc separator plate 215. The disc separator plate 215 is vertically lowered to the appropriate height of its mating horizontal slot on the base deck 205.

Figure 2D:
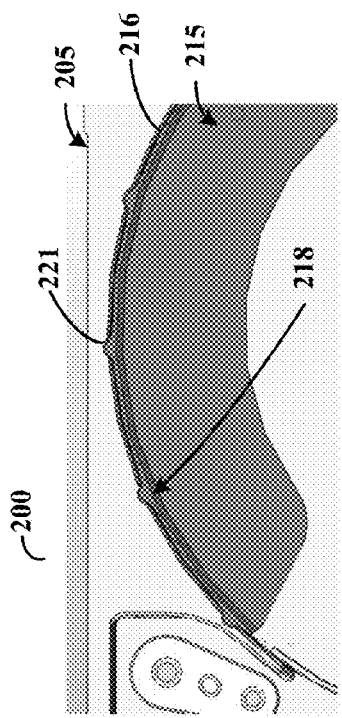
FIG. 2D is a top view of the base deck of FIG. 2A with a disc separator plate coupled thereto, consistent with various aspects of the present disclosure.

As shown in FIG. 2D, disc separator plate 215 has been rotated clockwise to disengage the extrusions of the disc separator plate 215 from the vertical slots 221. This rotation of the disc separator plate likewise engages the extrusions with the horizontal slots of the base deck 205. This embodiment allows the disc separator plate to be vertically assembled to the base deck 205, and locked into place at an appropriate vertical height without the use of fasteners, secondary processes, or other cost adding materials (e.g. screws, glue, welding, etc.). In more specific embodiments, the present disclosure may use posts (such as disclosed in detail above) to further secure the disc separator plates 215 to the base deck 205.

Figure 3B:
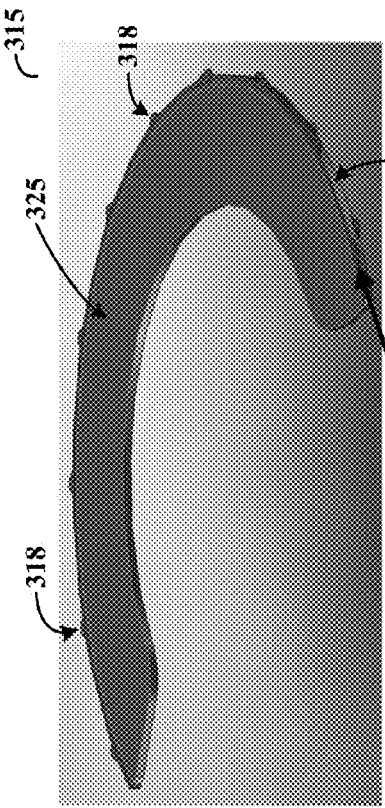
FIG. 3B is a perspective view of a disc separator plate as may be implemented with FIG. 3A, consistent with various aspects of the present disclosure.
Figure 3D:
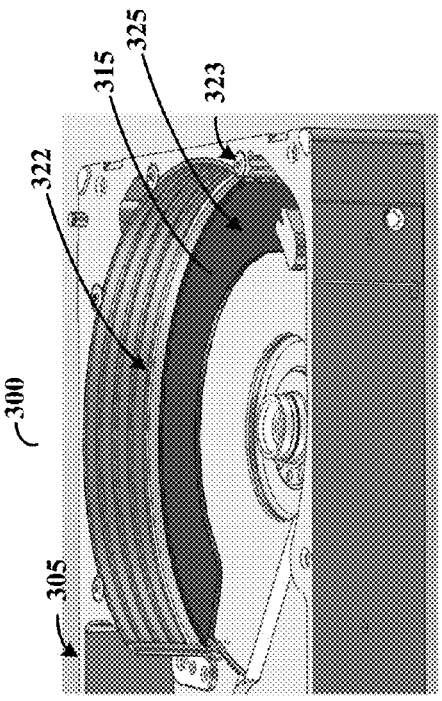
FIG. 3D is a perspective view of a disc drive assembly including components such as shown in FIGS. 3A, 3B and 3C, consistent with various aspects of the present disclosure.
Figure 3A:
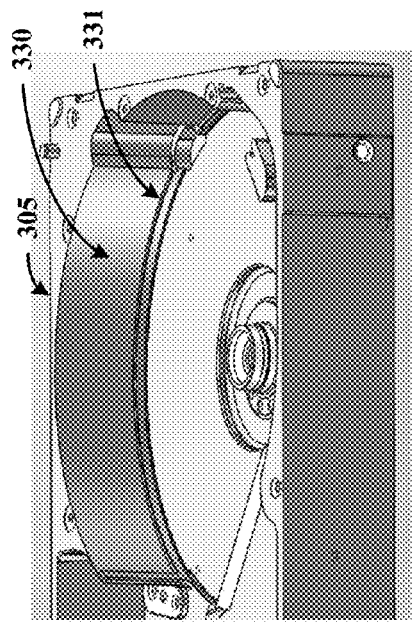
FIG. 3A is a perspective view of a base deck, consistent with various aspects of the present disclosure.

FIG. 3A shows a base deck 305, according to other embodiments of the present disclosure. The base deck 305 includes a sidewall 330 that forms a cavity operable for encompassing a disc drive assembly. At the distal end of the sidewall 330, a shoulder 331 extends along the circumference thereof, and is operable to support an assembly of alternating disc separator plates and stacking rings.

FIG. 3B shows a perspective view of a disc separator plate 315 according to one embodiment of the present disclosure. Extrusions 318 are spaced along the outer diameter of the disc separator plate 315, and interact with slots in the base deck. In some embodiments of the present disclosure, extrusions 318 extend across the outer circumferential surface 326, from the proximal surface 325 to the distal surface. In other embodiments, the extrusions 318 do not extend across the entire circumferential surface 326. In yet further specific embodiments of the present disclosure, the extrusion 318 extends across a portion of the circumferential surface 326 from the proximal surface 325, and is offset from another extrusion 318 that extends across a portion of the circumferential surface 326 from the distal surface. This pair of extrusions is further offset from a plurality of corresponding pairs of extrusions along the circumferential surface 326.

Figure 3C:
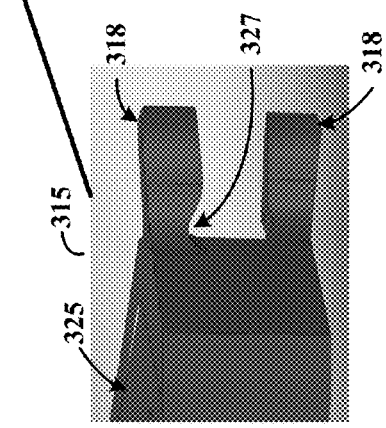
FIG. 3C is a perspective view of example extrusions, which may be implemented with the disc separator plate shown in FIG. 3B, consistent with various aspects of the present disclosure.

FIG. 3C shows a front view of one embodiment in which the extrusions 318 extend from a circumferential surface 326 of disc separator plate 315. In the present embodiment, the extrusions 318 protrude slightly above proximal 325 and distal surfaces of the disc separator plate 315. The extrusions 318 are compliant under pressure due in part to relief 327 (other relief designs, or alternative materials, are readily understood by one of skill in the art to provide compliance of the extrusions 318).

In FIG. 3D, a perspective view of a partial disc drive assembly 300 is shown. Disc separator plate 315 is seated against shoulder 331 and a sidewall 330 of the base deck 305 (as shown in FIG. 3A). A stacking ring 322 is inserted into the disc drive cavity and seated against a proximal surface 325 of the extrusions 318 and a sidewall 330 (as shown in FIG. 3A) of the base deck 305. This assembly process is repeated for the number of discs in the disc drive. When all the disc separator plates 315 and stacking rings 322 have been seated in the base deck cavity, screws 323 located on the proximal surface of the base deck 305 are tightened to establish the proper stack height of the disc separator plates 315 and stacking rings 322. In conjunction with one or more such embodiments, it has been discovered that the compression forces exerted on the extrusions 318 of each disc separator plate 315, by the screws 323, evenly deform the extrusions 318 of each disc separator plate 315. This deformation of the extrusions 318 self-corrects tolerance stack-up caused by high-tolerance parts (e.g., disc separator plates 315 and/or stacking rings 322). Moreover, such an embodiment minimizes stack-tilt (also referred to as a tilt moment) caused by the cumulative stacking of the disc separator plates 315 and stacking rings 322 (often due to high flatness tolerances of the stacked parts). This stack-tilt accumulates throughout the stack and creates the largest tilt on the top disc separator plate. The present embodiment mitigates such stack-tilt as none of the stacked parts surfaces are directly mated to surfaces of the neighboring parts in the stack, but instead are only fastened to one another to the extent required to establish proper stack height of the disc separator plates 315 and stacking rings 322. Accordingly, the present embodiment allows for the use of low-cost, high-tolerance parts, while preventing tolerance stack-up that could result in damage to the disc and data loss during vibration/shock events.

Based upon the above discussion and illustrations, those skilled in the art will readily recognize that various modifications and changes may be made to the present disclosure without strictly following the exemplary embodiments and applications illustrated and described herein. For example, the shape and location of the slots in the base deck and joining methodologies of the slots to the disc separator plates need not conform to the exemplary embodiments discussed herein; such joints as claimed may cover a wide variety of shapes and variations of a base deck with integrated disc separator plates, including irregular joints (e.g., dove-tail joints), snap joints, and other coupling means readily known to one of skill in the art (e.g., welding the disc separator plate to the base deck slot). Such modifications do not depart from the true spirit and scope of the present disclosure, including that set forth in the following claims.

What is claimed is:

1. An apparatus comprising:
    a plurality of storage mediums spaced apart from one another in a stacked arrangement, the storage mediums having planar surfaces separated by a thickness and exhibiting a periphery having a circular shape;
    a base deck including
        a sidewall forming a cavity and being configured and arranged to house the plurality of storage mediums, the sidewall having has an inner surface that extends at least partially along the periphery of the storage mediums, and
        a plurality of slots in the sidewall, the slots being aligned with spaces between peripheral ends of adjacent ones of the storage mediums, and extending into the inner surface and continuously and laterally along the periphery of the storage mediums in the inner surface; and a plurality of disc separator plates, each separator plate being fixed within and held by one of the slots, and each separator plate extending into one of the spaces between peripheral ends of adjacent ones of the storage mediums, the separator plates being configured and arranged with the base deck and slots to mitigate generation of gas flow via movement of the storage mediums.

2. The apparatus of claim 1, wherein
the inner surface is concentric with the periphery of the storage mediums.

3. The apparatus of claim 1, wherein
the base deck further includes a plurality of vertical grooves in the sidewall, the vertical grooves extending from a top surface of the base deck and through the plurality of slots in the sidewall, and each of the disc separator plates include at least one extrusion spaced along a peripheral end of the disc separator plate, the at least one extrusion being configured and arranged to interact with one of the vertical grooves in the base deck and to interlock with at least one of the plurality of slots in the sidewall.

4. The apparatus of claim 1, further comprising at least one post fastened to the base deck and configured and arranged to secure the plurality of disc separator plates to the base deck by applying a directed force that retains each of the plurality of disc separator plates within one of the slots.

5. The apparatus of claim 1, wherein each slot is configured and arranged to compress one of the disc separator plates within opposing sidewalls of the slot, therein securing the separator plate within the slot and fixing the separator plate in the space between the adjacent ones of the storage mediums.

6. The apparatus of claim 1,
further including a magnetoresistive transducer configured and arranged to access data storage locations on one of the plurality of storage mediums, and wherein the disc separator plates, sidewall, and slots are circumferentially disposed at the outer circumference of the plurality of storage mediums and configured and arranged to direct airflow generated by rotation of the storage mediums away from the magnetoresistive transducer, thereby mitigating gas flow forces upon the magnetoresistive transducer.

7. The apparatus of claim 1, wherein the disc separator plates are configured and arranged with the slots to mitigate air flow between the storage mediums along a surface of the sidewall in which the slots are formed.

8. The apparatus of claim 1, wherein the disc separator plates are configured and arranged with the slots to mitigate air flow-induced turbulence on the plurality of discs and to stabilize a layer of air flow at a junction between the peripheral ends of the plurality of storage mediums and the sidewall.

9. The apparatus of claim 1, wherein the disc separator plates and the base deck are configured and arranged to prevent contact between the plurality of storage mediums and the disc separator plates, via interaction between the separator plates and the slot that sets a fixed distance between the storage mediums and the separator plates.

10. An apparatus comprising:
a plurality of storage mediums spaced apart from one another in a stacked arrangement, each storage medium having a planar surface separated by a thickness and exhibiting a periphery having a circular shape;

a base deck including a sidewall forming a cavity and being configured and arranged to house the plurality of storage mediums;

a plurality of stacking rings having surfaces that are concentric with the periphery of the plurality of storage mediums and the base deck sidewall, the stacking rings extending contiguously and laterally along the periphery of the storage mediums; and a plurality of disc separator plates, each separator plate coupled to the base deck by at least one of the stacking rings, and each separator plate extending into one of the spaces between peripheral ends of adjacent ones of the storage mediums.

11. The apparatus of claim 10, wherein the disc separator plates are configured and arranged with the stacking rings and the base deck to mitigate generation of gas flow via movement of the storage mediums.

12. The apparatus of claim 10, wherein each of the plurality of disc separator plates include a plurality of extrusions spaced along a peripheral end of the separator plate, the plurality of extrusions being configured and arranged to interlock with at least one of the plurality of stacking rings.

13. The apparatus of claim 12, wherein the plurality of extrusions are configured and arranged to interact with the stacking rings by deforming under compression.

14. The apparatus of claim 10,
further including a fastener coupled to a proximal surface of the base deck and configured and arranged to exert a downward force upon the plurality of disc separator plates and stacking rings; and wherein the plurality of disc separator plates includes a plurality of extrusions spaced along its peripheral end, the plurality of extrusions being configured and arranged to interact with the stacking rings and to deform under compression exerted by the fastener via the downward force, and to maintain an upper surface of the plurality of disc separator plates and stacking rings about level with the proximal surface of the base deck.

15. The apparatus of claim 10,
further including a magnetoresistive transducer configured and arranged to access data storage locations on one of the plurality of storage mediums, and wherein the disc separator plates, sidewall, and stacking rings are circumferentially disposed at an outer circumference of the plurality of storage mediums, and are configured and arranged to direct gas flow generated by rotation of the discs away from the magnetoresistive transducer between the storage medium, thereby mitigating gas flow forces upon the magnetoresistive transducer.

16. The apparatus of claim 10, wherein the disc separator plates, sidewall, and stacking rings are circumferentially disposed at an outer circumference of the plurality of storage mediums and configured and arranged to mitigate gas flow between opposing surfaces of adjacent storage mediums.

17. The apparatus of claim 10, wherein the disc separator plates are configured and arranged to induce friction upon gases flowing along surfaces of the plurality of storage mediums.

18. The apparatus of claim 10, wherein the disc separator plates are configured and arranged with the base deck and stacking rings to prevent contact between the plurality of storage mediums and the disc separator plates, via interaction between the separator plates and the stacking rings that sets a fixed distance between the storage mediums and the separator plates.

19. An apparatus comprising:
- a plurality of storage mediums spaced apart from one another in a stacked arrangement, each storage medium having a planar surface separated by a thickness and exhibiting a periphery having a circular shape;
- a plurality of stacking rings having surfaces that are concentric with the periphery of the plurality of storage mediums and the base deck sidewall;
- a base deck including a sidewall forming a cavity and being configured and arranged to house the plurality of storage mediums;
- a plurality of slots having sidewalls aligned with spaces between peripheral ends of adjacent ones of the storage mediums; and
- a plurality of disc separator plates, each separator plate being fixed within and held by the sidewalls of one of the slots, and each separator plate extending into one of the spaces between peripheral ends of adjacent ones of the storage mediums.

20. The apparatus of claim 19,
wherein the stacking rings extend contiguously and laterally along the periphery of the storage mediums;
wherein the plurality of slots have sidewalls defined by the stacking rings; and
wherein the plurality of disc separator plates are coupled to the base deck by at least one of the stacking rings.

* * * * *